(12) United States Patent
Milliken

(10) Patent No.: US 8,438,401 B2
(45) Date of Patent: May 7, 2013

(54) DEVICE AND METHOD FOR SECURELY STORING DATA

(75) Inventor: Walter Clark Milliken, Dover, NH (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 666 days.

(21) Appl. No.: 12/564,181

(22) Filed: Sep. 22, 2009

(65) Prior Publication Data

US 2011/0072279 A1 Mar. 24, 2011

(51) Int. Cl.
*G06F 21/00* (2006.01)

(52) U.S. Cl.
USPC ........... 713/189; 713/190; 713/191; 713/192; 713/193; 713/194

(58) Field of Classification Search .................. 713/171, 713/189–194; 380/24, 44–46, 264–265
See application file for complete search history.

(56) References Cited

U.S. PATENT DOCUMENTS

| | | | | |
|---|---|---|---|---|
| 5,455,862 A * | 10/1995 | Hoskinson | ................ | 380/262 |
| 5,467,396 A * | 11/1995 | Schossow et al. | ............ | 713/193 |
| 5,768,389 A * | 6/1998 | Ishii | ................ | 380/30 |
| 6,058,476 A * | 5/2000 | Matsuzaki et al. | ............ | 713/169 |
| 6,373,946 B1 * | 4/2002 | Johnston | ................ | 380/211 |
| 6,567,794 B1 * | 5/2003 | Cordery et al. | ................ | 705/60 |
| 6,587,947 B1 * | 7/2003 | O'Donnell et al. | ............ | 713/187 |
| 6,769,062 B1 * | 7/2004 | Smeets et al. | ................ | 713/189 |
| 6,802,001 B1 * | 10/2004 | Dent | ................ | 713/171 |
| 6,832,319 B1 * | 12/2004 | Bell et al. | ................ | 713/193 |
| 7,725,740 B2 * | 5/2010 | Kudelski et al. | ............ | 713/194 |
| 7,934,256 B2 * | 4/2011 | Matsushima et al. | ........... | 726/22 |
| 7,970,135 B1 * | 6/2011 | Schwenk | ................ | 380/46 |
| 8,094,819 B1 * | 1/2012 | Limondin et al. | ............ | 380/228 |
| 8,112,634 B2 * | 2/2012 | Aciicmez et al. | ............ | 713/189 |
| 8,321,660 B2 * | 11/2012 | Ju et al. | ................ | 713/150 |
| 2001/0042205 A1 * | 11/2001 | Vanstone et al. | ............ | 713/171 |
| 2005/0010786 A1 * | 1/2005 | Michener et al. | ............ | 713/185 |
| 2007/0011429 A1 * | 1/2007 | Sangili et al. | ................ | 711/203 |
| 2008/0072071 A1 * | 3/2008 | Forehand et al. | ............ | 713/193 |
| 2008/0270372 A1 * | 10/2008 | Hsu et al. | ................ | 707/4 |
| 2009/0210722 A1 * | 8/2009 | Russo | ................ | 713/189 |
| 2009/0245510 A1 * | 10/2009 | Ciet et al. | ................ | 380/29 |
| 2010/0115286 A1 * | 5/2010 | Hawkes et al. | ............ | 713/189 |

(Continued)

OTHER PUBLICATIONS

"Advanced Encryption Standard (AES)", Federal Information Processing Standards Publication 197, Nov. 26, 2001, pp. 1-51, issued by the National Institute of Standards and Technology (NIST).

*Primary Examiner* — Catherine Thiaw

(74) *Attorney, Agent, or Firm* — Christie, Parker & Hale, LLP

(57) ABSTRACT

Devices and methods for securely storing data are provided. A device for constructing an encryption key comprising a tamper-protection barrier that encloses one or more memory devices is provided. The memory stores data for constructing the encryption key. The memory may include a single memory device or a plurality of memory devices. The tamper-protection barrier also encloses a security processor configured to combine the data stored in the memory based in part on a function, such as a logical exclusive-or (XOR) function, to construct the encryption key. The stored data in the memory may include partial keys. These partial keys may be created based in part on applying the XOR function to an encryption key.

25 Claims, 6 Drawing Sheets

U.S. PATENT DOCUMENTS

| | | | |
|---|---|---|---|
| 2010/0146304 A1* | 6/2010 | Miyatake et al. | 713/194 |
| 2010/0250938 A1* | 9/2010 | Potkonjak | 713/171 |
| 2010/0296651 A1* | 11/2010 | Tkacik | 380/44 |
| 2011/0002461 A1* | 1/2011 | Erhart et al. | 380/44 |
| 2011/0055585 A1* | 3/2011 | Lee | 713/183 |
| 2011/0099387 A1* | 4/2011 | Gremaud et al. | 713/190 |

* cited by examiner

DEVICE AND METHOD FOR SECURELY STORING DATA

GOVERNMENT CONTRACT

The U.S. Government has certain rights to this invention as provided for by the terms of Contract No. W9113M-07-C0107 awarded by United States Army.

BACKGROUND OF THE INVENTION

1. Field of the Invention

The invention relates to the field of secure cryptography. It particularly concerns devices and methods for securely storing a secret within a tamper-protection barrier.

2. Background Information

The security of electronic data is of paramount importance in today's computer-based world. Many commercially-available devices and systems store electronic data or other information that should not be accessible to unauthorized users or attackers. This secret may itself be sensitive and/or valuable, or it may be used to access sensitive and/or valuable information. If an attacker were to obtain access to the secret within these devices or systems, they could then access the sensitive information. In some cases, this results in a loss of privacy or a financial loss. A user who is able to access the secret could access consumer information, e.g., personal health information (PHI), social security numbers, account numbers, account passwords, and contact information. For instance, automated teller machines (ATMs) store a secret code, e.g., a 128-bit number, that is used in the transmission of a customer's personal information, e.g., bank account numbers, through a communication channel between an ATM and a respective bank information technology (IT) system. This secret code, or the information that it provides access to, are not meant be accessible to an unauthorized user or attacker. In hospital environments, for example, the sensitive or valuable electronic data may be PHI.

To protect such secrets, many devices and systems, e.g. modern ATMs, store the secret, and related data if any, within a tamper-protection barrier. This barrier is an electronic and/or physical shield such that if an unauthorized user or attacker penetrates the barrier, the secret is automatically destroyed before the attacker is able to use the secret to access sensitive data.

However, even in devices with tamper-protection barriers, there is still the possibility that given enough time and financial resources, a clever and/or persistent attacker may still be able to access the secret. For instance, an attacker may be able to use a tiny physical probe and attach this probe to electrical connections (e.g. joint test action group (JTAG) pins) on a memory device to access portions of data from the memory device within the tamper-protection barrier. With enough time and a sufficient number of samples of the device, clever attackers could access enough information from the memories within the tamper-protection barriers such that they are able to obtain the secret. Thus, even devices which store secrets within a tamper-protection barrier are still vulnerable to clever and/or persistent attackers.

Therefore, there exists a need for a device or method for securely storing a secret or sensitive data within a tamper-protection barrier such that even with substantial time, financial resources, and a large number of samples of the devices, clever attackers would still not be able to access the data.

SUMMARY OF THE INVENTION

The devices and methods described herein, in various embodiments, addresses deficiencies in the prior art by providing devices, and methods for securely storing data in devices with anti-tamper protections and secret encryption. Specifically, the devices and methods described herein can provide for secure data storage within a tamper-protection barrier such that the secret within the tamper-protection barrier is less prone to attackers. Furthermore, the devices and methods described herein ensure that such that an attacker would not be able to access the secure data even with a relatively large number of samples of the device.

In one aspect, the invention relates to a device for constructing an encryption key. The encryption key may be of arbitrary length and in some implementations may have 4, 8, 16, 32, 64, 128, 256, 512, 1024, 2048, 4096, or 8192 bits. The device may include a tamper-protection barrier that encloses memory and a security processor. The memory may store data for constructing the encryption key. In some embodiments, the memory may include a single memory device for storing data for constructing the encryption key. In some embodiments, the memory stores at least one of random data and pseudo-random data. In some embodiments, the memory includes a plurality of memory devices, of which at least two memory devices store data for constructing the encryption key. In some embodiments, at least two of the memory devices store random or pseudo-random data for constructing the encryption key. This random or pseudo-random data may be generated using a high quality random number generator. The random number generator may generate one of a 4, 8, 16, 32, 64, 128, 256, 512, 1024, 2048, 4196, 8192, or an arbitrarily large bit number.

In some embodiments, the security processor is configured to combine the stored data based in part on a function to construct the encryption key. In some embodiments, the function is one of a logical function, a mathematical function, and a string function. In some embodiments, the function is an "exclusive or" or "XOR" function. In some embodiments, the security processor is configured to combine the data stored in the at least two memory devices based in part on at least one of a linked list and an array. The array may be a pointer array.

In some embodiments, the security processor is configured to destroy a constructed encryption key if the processor detects the penetration of the tamper-protection barrier. In some embodiments, the security processor is configured to use a constructed encryption key to decrypt secure data. In some embodiments, the security processor is configured to deconstruct a constructed encryption key after the secure data is decrypted. In some embodiments, the security processor is configured to destroy a constructed encryption key after the secure data is decrypted. In some embodiments, the security processor is configured to authorize the performance of a task using a constructed encryption key.

In some embodiments, the secure data is stored in the memory. In some embodiments, the secure data is outside the tamper-protection barrier and decrypted within the tamper-protection barrier. In some embodiments, the stored data in the memory includes at least two partial keys which are used by the security processor to construct the encryption key. In some embodiments, the partial keys may indicate memory locations of the respective encryption key components. In some embodiments, a first partial key includes a pointer to a memory location of a second partial key. In some embodiments, at least one of the partial keys contains at least one of random data and pseudo-random data. In some embodiments, the security processor is configured to destroy the partial keys if the security processor detects the penetration of the tamper-protection barrier.

In some embodiments, the security processor is also configured to create partial keys for storage in the memory based in part on a function to deconstruct the encryption key, store the created partial keys in the memory, and destroy the encryption key after storing the created partial keys.

In some embodiments, the security processor receives authorization data for initiating the process of combining the data stored in the memory. In other embodiments, the process of combining the data occurs spontaneously in response to a set of predetermined conditions being satisfied. For example, the process may begin at one or more set times or locations, as determined by GPS, altimeter, or other location data. The security processor may locate a first partial key using received authorization data or other data stored on the device. Optionally, the security processor locates all the partial keys using the received authorization data.

In some embodiments, the security processor is configured to deconstruct the generated encryption key in a time period after the secure data is decrypted. In these embodiments, the time period may be of arbitrary length and in some implementations may range between 15 seconds and 1 hour, e.g., one minute. In an embodiment, the security processor is configured to authorize the performance of a task using the constructed encryption key.

In another aspect, invention relates to a method for constructing an encryption key. The method includes a security processor storing data for constructing the encryption key in memory enclosed in a tamper-protection barrier, and the security processor combining, within the tamper-protection barrier, the data stored in the memory based in part on a function to construct the encryption key. The function may be one of a logical function, a mathematical function, and a string function, e.g., an "exclusive or" or XOR function.

In some embodiments, the method includes the security processor using, within the tamper-protection barrier, the constructed encryption key to decrypt secure data. In some embodiments, the method includes the security processor destroying, within the tamper-protection barrier, the constructed encryption key after the secure data is decrypted. In some embodiments, the method includes the security processor deconstructing, within the tamper-protection barrier, the constructed encryption key after the secure data is decrypted. In some embodiments, the method includes the security processor creating, within the tamper-protection barrier, partial keys for storage in the memory based in part on the function to deconstruct the encryption key, the security processor storing, within the tamper-protection barrier, the created partial keys in the memory, and the security processor destroying, within the tamper-protection barrier, the encryption key after storing the created partial keys. In some embodiments, the data stored in memory may be combined within the tamper-protection barrier based in part on at least one of a linked list and an array. In some embodiments, the data stored in the memory may include at least two partial keys which are used by a security processor to construct the encryption key.

As used herein, the term "partial key" refers to a collection of data that can be used in the process of constructing or deconstructing an encryption key. In some embodiments, a partial key may describe the location of another partial key in a memory device. In other embodiments, one partial key may be combined with another partial key to construct an encryption key.

In this application, embodiments will be described in reference to a device that contains a tamper-protection barrier within which a secret is stored. It is to be understood that the systems and methods discussed herein are applicable to any suitable device in which one needs to securely store a secret or other sensitive data such that an attacker would not be able to access the sensitive data with a relatively large number of samples of the device.

BRIEF DESCRIPTION OF THE DRAWINGS

The invention description below refers to the accompanying drawings, of which.

DESCRIPTION OF CERTAIN ILLUSTRATIVE EMBODIMENTS

To provide an overall understanding of the invention, certain illustrative embodiments will now be described. However, it will be understood by one of ordinary skill in the art that the methods described herein may be adapted and modified as is appropriate for the application being addressed and that the devices and methods described herein may be employed in other suitable applications, and that such other additions and modifications will not depart from the scope hereof.

Figure 1A:
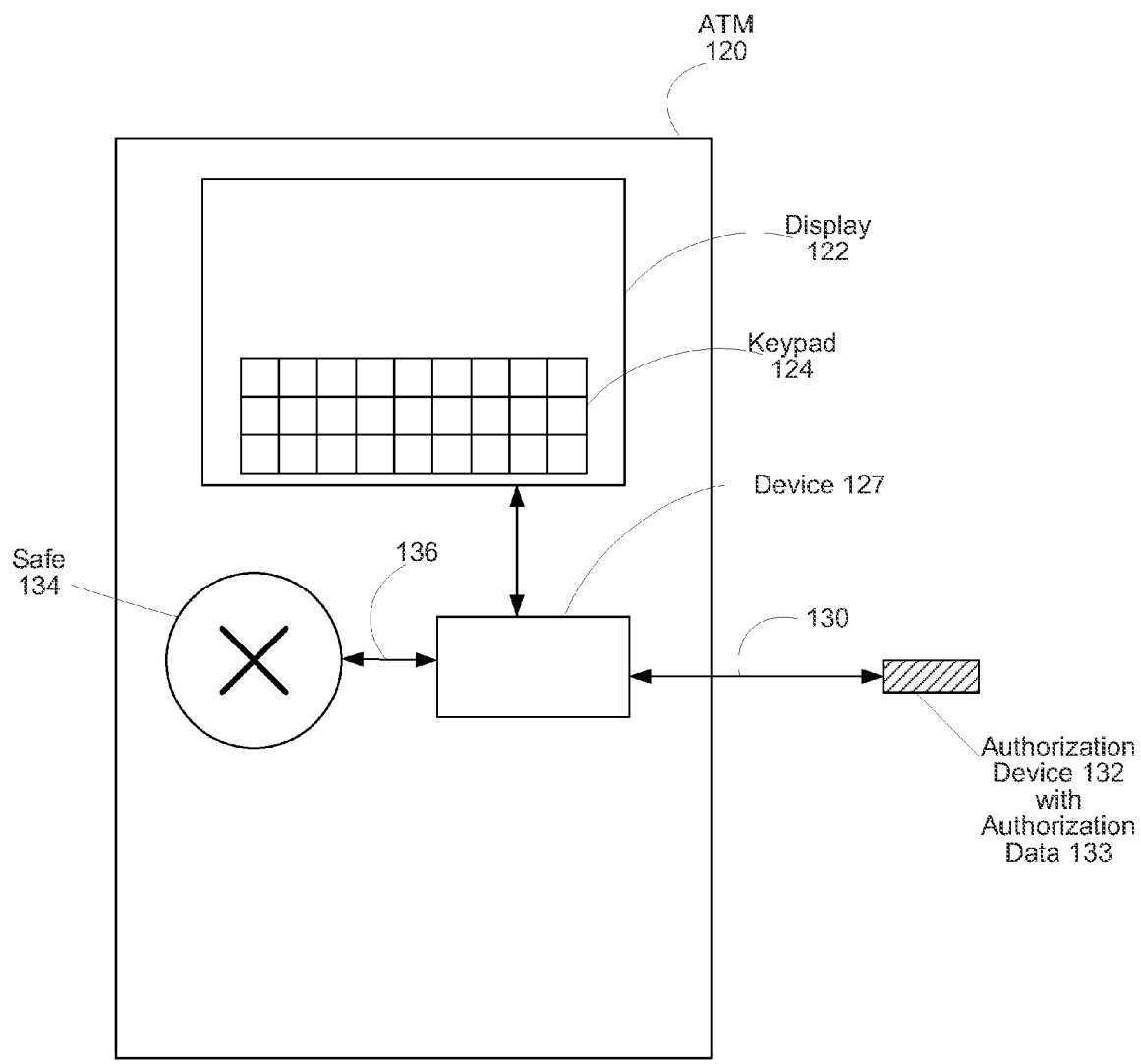
FIG. 1A is a diagram of an ATM, illustrative of a device in which a secret may be stored within a tamper-protection barrier.

FIG. 1A is an illustration of an ATM 120, an example of a system that can be used to store a secret, according to an illustrative embodiment. ATM 120 includes a display 122, keypad 124, safe 134, and device 127. Device 127 within ATM 120 communicates with the display 122, keypad 124, and safe 134 (via communication channel 136). Device 127 may receive inputs from the keypad 124, display 122, or an external authorization device 132.

As with most ATMs, people who wish to use the ATM 120 must enter a personal identification number (PIN) on keypad 124 or on display 12. This PIN must correspond to their ATM access card to conduct any transactions. Once the user is identified as being authorized to conduct a transaction, they may obtain cash from the ATM, or deposit paper checks and/or cash into the ATM. Safe 134 is used to store valuables such as the checks that have been deposited at the ATM 120 or currency notes for disbursement by the ATM 120.

Device 127 securely stores a secret that is needed to access the contents of safe 134. In ATM 120, this secret is the sequence of numbers required to unlock the safe. Periodically, a bank employee or other authorized person needs to access safe 134 to remove the deposited checks and currency notes. However, in ATM 120, the safe 134 can only be unlocked based in part on being able to access the secret. Device 127 uses encryption methods to construct and store an encryption key for accessing the secret, as will be described in reference to FIGS. 1B-4B.

Figure 1B:
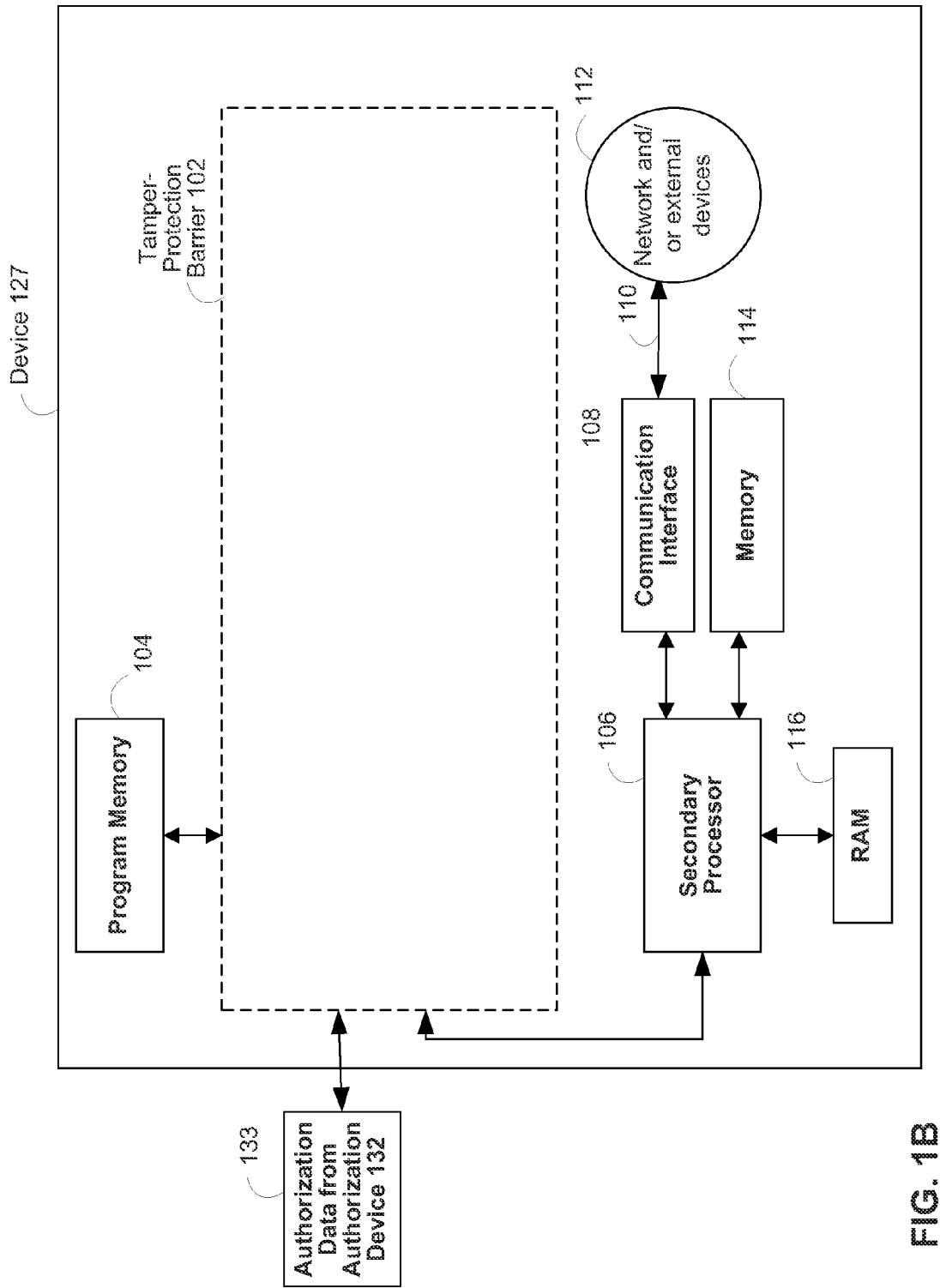
FIG. 1B is a block diagram of another exemplary device, illustrative of a device in which a secret may be stored within a tamper-protection barrier.

FIG. 1B is a block diagram of device 127, illustrative of a device within which a secret may be stored within tamper-protection barrier 102, according to an illustrative embodiment of the invention. This tamper-protection barrier may be any suitable physical or electronic shield such that if the barrier is penetrated or compromised, the contents within the barrier are destroyed. Integrated circuits (ICs) having tamper-protection barriers are commercially-available. An example of a suitable IC with a tamper-protection barrier includes Dallas Semiconductor's DS28CN01, provided by Maxim Integrated Products of Sunnyvale, Calif.

In addition to a secret, device 127 includes a number of components that are dedicated to encrypting, decrypting, and storing information for accessing the secret. The components within the tamper-protection barrier 102 may communicate with an external program memory 104 or a secondary processor 106. Secondary processor 106 may communicate with random-access memory 116 and memory 114. In addition, via communication interface 110, e.g., a high-speed internet connection, secondary processor 106 may send or receive information 110 from external devices or networks 112.

In some embodiments, the secret in device 127 may be accessed using an encryption key that is stored in tamper-protection barrier 102. An encryption key is quite often a sequence of binary numbers, e.g., "001" or "1011". Encryption keys are typically on the order of 128 or 256 bits, however, they may be much larger or much smaller depending on the sensitivity of the secret that is being protected in device 127. Devices, e.g., device 127, that store encrypted information such as encryption keys are referred to as cryptographic devices. The secret itself is stored within or, assuming the secret is encrypted, outside of tamper-protection barrier 102. Thus, if the attacker were able to penetrate the tamper-protection barrier 102, the attacker would still need to obtain the encryption key to access the secret.

In one embodiment, the encryption key for accessing the secret is used as the starting point for creating one or more partial keys. These partial keys are used to construct the original encryption key, however, each individual partial key is not useful for accessing the secret. An attacker would need to know at least the location in memory of all the partial keys in order to recreate the encryption key.

In some embodiments, as described in reference to FIGS. 2-4B, the encryption key may be stored within the tamper-protection barrier 102 in two or more "partial keys", each of which may, but need not be encrypted. A partial key refers to a collection of data that can be used in the processes of constructing and/or deconstructing and/or destroying an encryption key. For example, in one embodiment, a partial key is combined with another partial key to construct an encryption key. In a second embodiment, the first partial key describes the memory location of a second partial key.

With reference to FIGS. 1A and 1B, to gain access to the secret, a person provides authorization data 133 to device 127. This authorization data could be provided to components within the tamper-protection barrier 102, or to the secondary processor 106. This authorization data could be transmitted over communication signal 130 from an authorization device 132. In some embodiments, the authorization data 132 is transmitted as a radio frequency signal from a dongle. In other embodiments, authorization data 132 is a PIN that the authorized user enters on keypad 124. In certain embodiments, authorization device is a specific physical key which, when inserted into a specific lock on ATM 120, provides authorization data 133 to device 127. In other embodiments, the authorization data is transmitted from the bank IT system to ATM 120. In some embodiments, the authorization data is in the form of a biometric identification such as a scan of an authorized user's fingerprint or retina. In still another embodiment, the authorization is retrieved internally in response to one or more criteria being met. For example, authorization data could be retrieved from memory upon the device reaching a predetermined location, as determined by an on-board global navigation satellite system processor. Alternatively, the authorization data is retrieved at a predetermined time as determined by a system clock or from an external timing signal.

When device 127 receives authorization data 133, it processes this data to identify multiple partial keys which are combined together to obtain an encryption key, which is stored in memory. This encryption key can then be used to recover the secret, e.g., device 127 can send a signal over communication channel 136 to safe 134, thereby unlocking the safe for the authorized user. The process of recovering the encryption key from two or more partial keys is referred to as "key construction", and will be described in more detail in reference to FIGS. 3 and 4A.

After the encryption key is used, the device 127 breaks the encryption key back down into multiple partial keys. The partial keys are then stored in memory and the encryption key is erased from memory, i.e., destroyed. The process of breaking the encryption key back down into multiple partial keys and erasing the encryption key from memory is known as "key deconstruction", and will be described in more detail in relation to FIGS. 3 and 4B.

Figure 2:
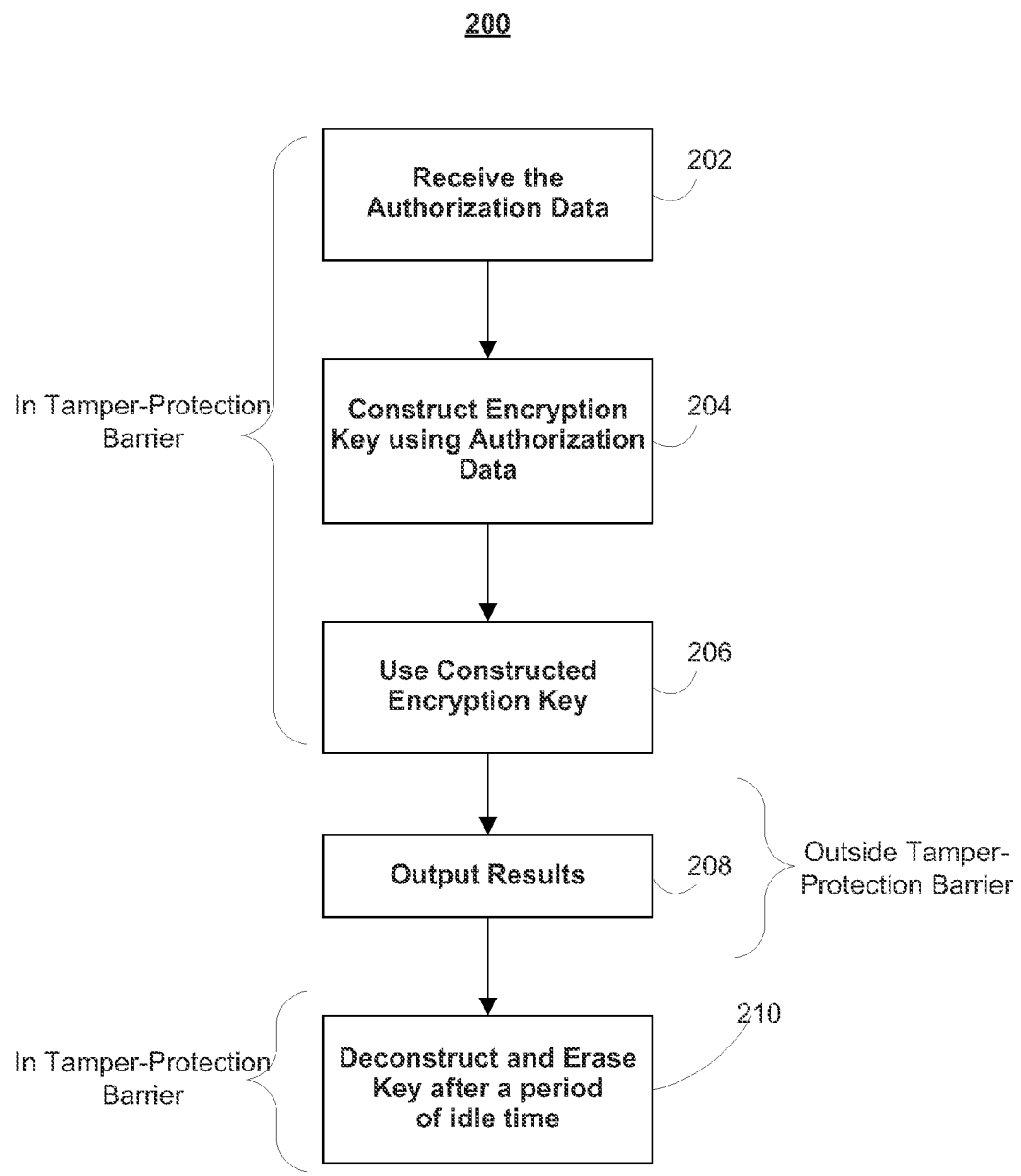
FIG. 2 is a process flow diagram for using an encryption key, according to an illustrative embodiment.

FIG. 2 is a process flow diagram 200 for using an encryption key, according to an illustrative embodiment. Process 200 could be used in a device such as device 127 of FIGS. 1A and 1B.

With continued reference to FIGS. 1A, 1B, and 2, process 200 begins when device 127 receives the authorization data 133 from authorization device 132 (step 202). For instance, in the case of ATM 120, the authorization data is a PIN entered by an authorized user on keypad 124. In other applications, e.g., in software encryption, the authorization data may be a security token or a PIN, which is only provided to authorized software users. In some embodiments, e.g., in digital media rights management, the authorization data is simply an implicit "run" command or external signal that instructs the device 127 to perform the construction of an encryption key, without an explicit token or PIN. The device 127 then constructs an encryption key using the authorization data (step 204). For example, the authorization data 133 can be used to identify 2 or more partial keys which, when combined, yield the encryption key. The encryption key is then constructed from these partial keys using logical functions, mathematical functions, string functions, or any combination thereof. Examples of logical functions include "exclusive or", "and", "or", "nor", and "nand" functions. Examples of mathematical functions include addition, subtraction, multiplication, and division. Examples of string functions include bit concatenation and bit inversion. For example, the 2-bit partial keys 10 and 01 could be concatenated to construct a 4-bit encryption key 1001. Note that the encryption key is constructed inside the tamper-protection barrier, as is described in more detail below in relation to FIG. 4A.

The constructed encryption key is then used to perform a task (step 206). For instance, in the case of ATM 120, the encryption key could be used to access the secret code for opening safe 134. The result of this exercise would be an open safe 134 (step 208). In other applications, e.g., in software encryption, this encryption key could be used to decrypt and then compile, install and/or execute the software (step 208). Once the encryption key has been used and/or has not been in use for a period of "idle" time, e.g., 15 seconds to an hour, it is deconstructed into multiple partial keys and the encryption key is erased from memory (step 210). For instance, for software encryption, once the software has been run, compiled, or installed, the encryption key can be deconstructed and destroyed (erased from memory). In the case of ATM 120, once the safe 134 has been re-sealed by the authorized user, the encryption key for accessing the secret code may be deconstructed and erased. The key deconstruction process is performed inside the tamper-protection barrier, and will be described in more detail below in relation to FIG. 4B.

Figure 3:
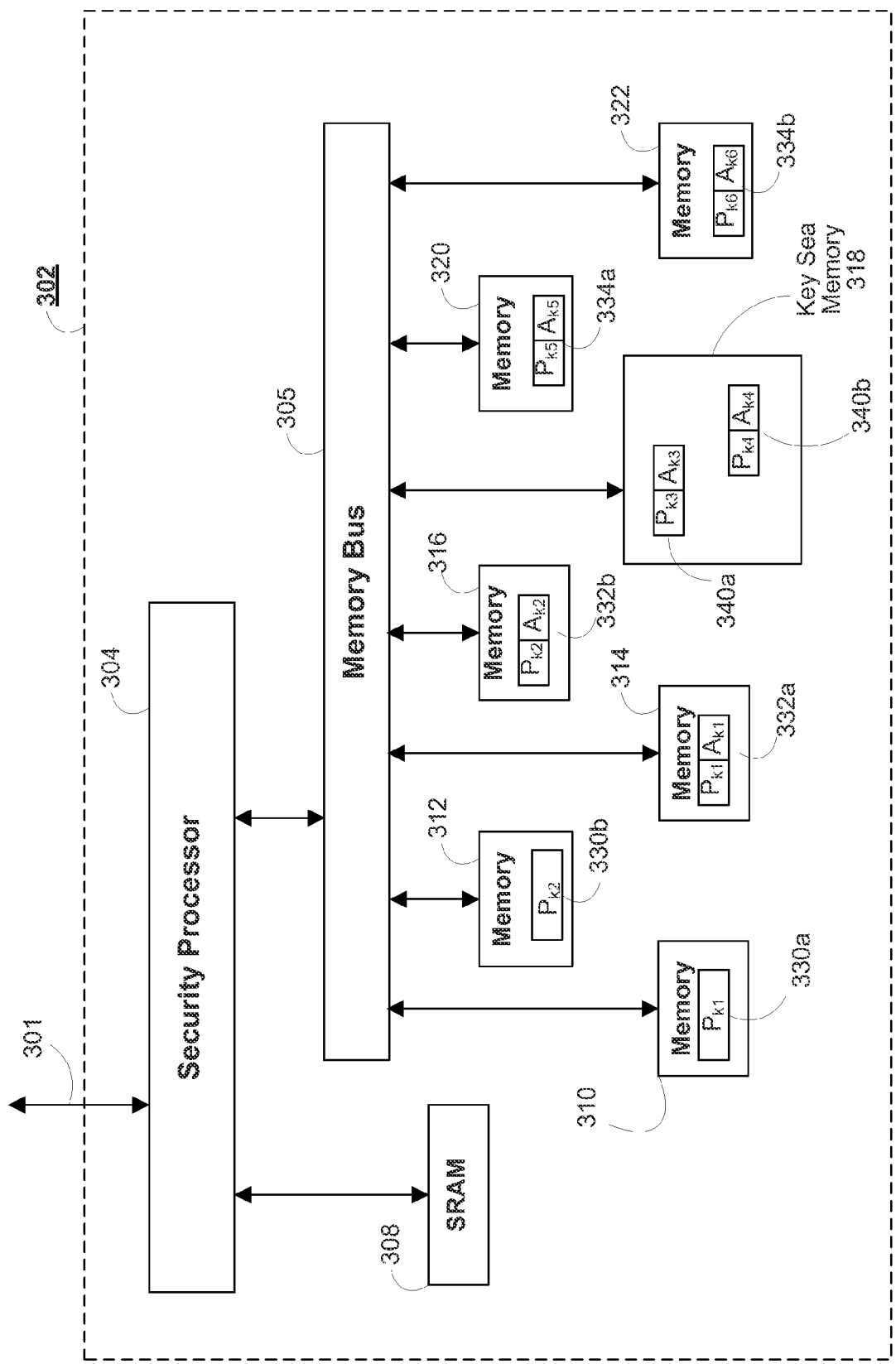
FIG. 3 is a block diagram of the components within an exemplary tamper-protection environment, according to an illustrative embodiment.

FIG. 3 is a block diagram of the components within an exemplary tamper-protection barrier 302, according to an illustrative embodiment. Tamper-protection barrier 302 may be a part of a device, e.g., device 127 with tamper-protection barrier 102 of FIGS. 1A and 1B. Tamper-protection barrier 302 may enclose a secret as well as multiple partial keys that can be used to construct an encryption key.

Within the tamper-protection barrier 302, there is a security processor 304, static random access memory (SRAM) 308, and memory devices 310, 312, 314, 316, 318, 320, 322. Each of the memory devices may be, inter alia, flash memory associated with security processor 304, static, pseudo-static, dynamic random-access memory (RAM), or read-only memory (ROM), and communicate with security processor 304 via memory bus 305. The memory bus 305 may include any communications channel to other memory devices or a conventional memory processor or input/output (I/O) bus, e.g., a peripheral component interconnect (PCI) interface. Such a channel may involve the use of communications standards such as inter-integrated circuit (I2C), serial programming interface (SPI), or universal serial bus (USB), or any other communications standard.

Security processor 304 connects with other devices or systems external to the tamper-protection barrier 302 via connection 301. For instance, in some embodiments, security processor 304 connects to an external program memory (not shown in FIG. 3). In some embodiments, such an external program memory contains an encrypted code package which can be loaded into a memory device within tamper-protection barrier 302 for manipulation by security processor 304. In these embodiments, an attacker has unlimited access to the external program memory as it resides outside the tamper-protection barrier 302.

Memory devices 310, 312, 314, 316, 318, 320, and 322 include partial keys 330a, 330b, 332a, 332b, 340a, 340b, 334a, and 334b, respectively. Each partial key contains key data, and in some cases, a pointer to a location of another partial key. The data includes information, e.g., "$P_{k1}$" in partial key 330a and "$P_{k2}$" in partial key 330b, that is manipulated by security processor 304 to create the encryption key. The pointer either contains data that describes a different memory location in (noted with an "A" or is empty). For instance, partial keys 330a and 330b have no pointers, while partial keys 332a, 332b, 340a, 340b, 334a, and 334b have pointers. In the various embodiments described below in relation to FIGS. 3, 4A, and 4B, two or more of these partial keys are used in the key construction and deconstruction processes. In each of these embodiments, the constructed encryption key is used to access a secret as described in relation to FIGS. 1A and 1B.

In some embodiments, these partial keys are stored in the memory device(s) within the cryptographic device. In other embodiments, it is desirable that some partial keys be stored in the memory on a host e.g. a large computer, while other partial keys be stored in the memory of a portable device or medium e.g. a flash memory. In order to recreate the original encryption key, an attacker would need to have access to the memory in both the portable device/medium and the host.

In an embodiment, memory devices 310, 312, 314, 316, 318, 320, and 322 are inaccessible to an attacker, however, it is possible that a clever, persistent attacker may be able to access, albeit at a very slow rate and at great expense, the partial keys within one or more of these memory devices. In another embodiment, a single memory device 318 of FIG. 3 stores random or pseudo-random data or a "key sea". Within this key sea, partial keys 340a and 340b are not distinguishable from other random or pseudo-random data in the memory 318. For example, if the random or pseudo-random data is binary, it is the case that a clever attacker can access a few bits of data within one or more of these memory devices without disturbing the tamper-protection barrier. Nevertheless, even if an attacker was able to access memory device 318, the attacker would not be able to distinguish between random or pseudo-random data and partial keys, increasing the security of the encryption key.

In addition, if tamper-protection barrier 302 is penetrated or compromised, all registers within security processor 304 and the memory devices 310, 312, 314, 316, 318, 320, and 322 within the tamper-protection barrier 302 are erased. It is particularly easy to erase data from static random access memory (SRAM).

As will be described in reference to FIGS. 3 and 4A, upon receiving authorization data, the security processor 304 constructs the encryption key by appropriately combining the authorization data and/or the partial keys.

Figure 4A:
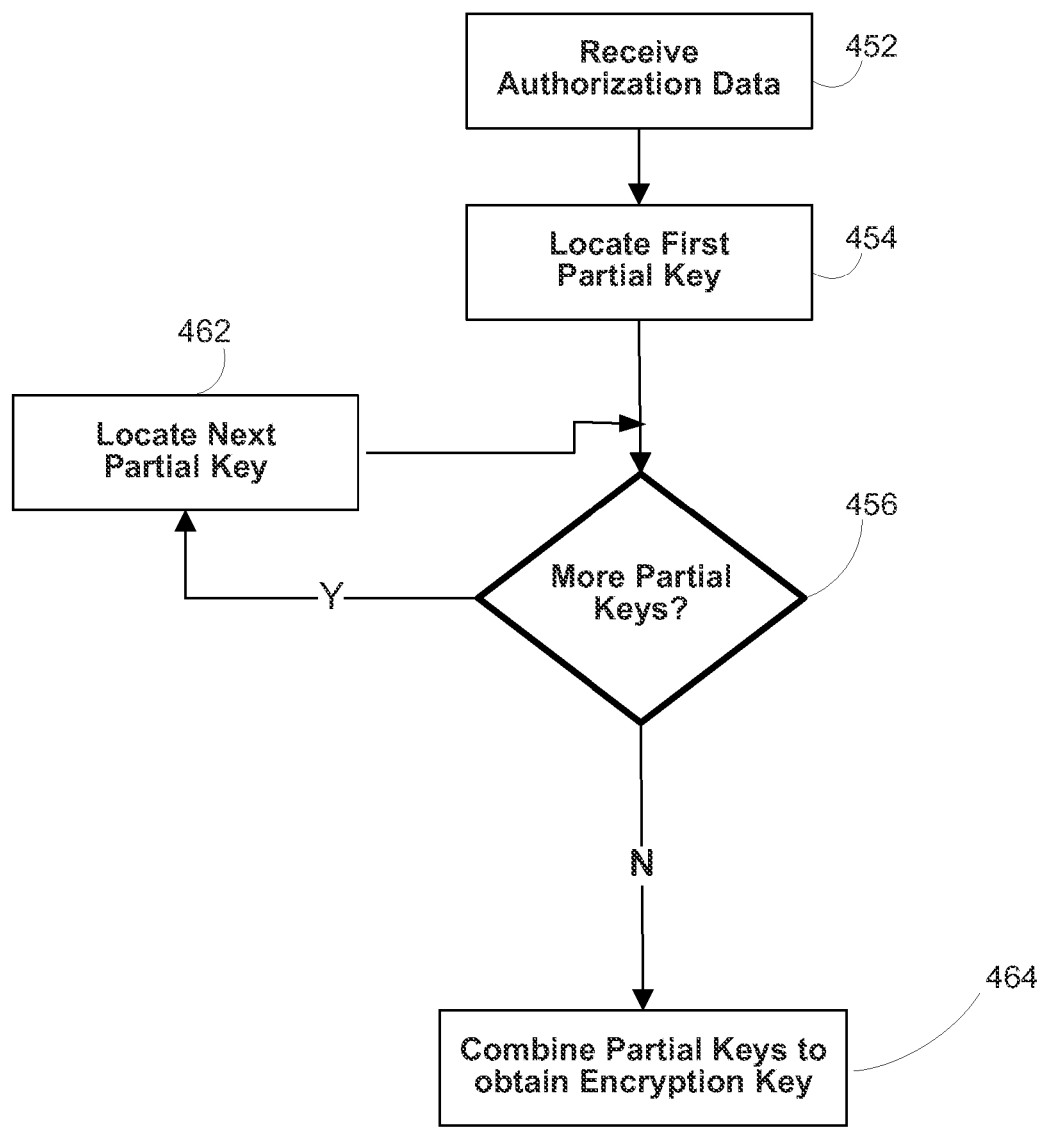
FIG. 4A is a process flow diagram for constructing an encryption key, according to an illustrative embodiment.

FIG. 4A is an exemplary process flow diagram 450 for constructing an encryption key, according to an illustrative embodiment. The security processor 304 receives authorization data (step 452). In some embodiments, the authorization data itself contains information that allows security processor 304 to locate the first partial key. In other embodiments, the authorization data contains instructions that allow security processor to begin constructing the encryption key. Based on the authorization data, the security processor 304 then locates the first partial key (step 454), and if there are more partial keys, these partial keys are located, too (steps 456 and 462). The partial keys are then combined to obtain the encryption key (step 464). The combination of the partial keys could involve the use of one or more of any suitable mathematical, logical, or string function, or any combination thereof. In an alternative embodiment, the security processor 304 locates the first partial key (step 454), and then locates the second partial key and combines it with the first partial key using the mathematical function. If there are more partial keys, these partial keys are located sequentially and combined with the previously located partial keys, until the encryption key is constructed.

With continued reference to FIGS. 3 and 4A, in a first implementation, the security processor 304 is configured to use the authorization data to identify the memory locations of two partial keys, e.g., partial keys 330a and 330b. For example, the authorization data may include, in plain or encrypted form, the identification of the respective memory devices and addresses within those memory devices storing the partial keys (step 452 and 454). The security processor 304 then retrieves the first partial key 330a (step 454) and the second partial key 330b (steps 456 and 462). The data $P_{k1}$ and $P_{k2}$ within partial keys 330a and 330b, respectively, are then appropriately combined to construct the encryption key (step 464). The combination of the data $P_{k1}$ and $P_{k2}$ within the partial keys could involve the use of any suitable mathematical, logical, or string function or any combination thereof. For instance, the data $P_{k1}$ and $P_{k2}$ in partial keys 330a and 330b could be concatenated to obtain the encryption key, or, preferably the data $P_{k1}$ and $P_{k2}$ in partial keys 330a and 330b are combined using an "exclusive or" logical function.

In a second implementation, the security processor 304 is configured to use the authorization data to identify less than all of the partial keys. In this embodiment, the security processor 304 is configured to use the authorization data to locate at least one partial key, e.g., partial keys 332a and 332b (steps 454, 456 and 462). Partial key 332a contains a pointer $A_{k1}$ to partial key 340a, while partial key 332b contains a pointer $A_{k2}$ to partial key 340b. The data within partial keys 340a and 340b, $P_{k3}$ and $P_{k4}$, respectively, each of which resides in key sea 318, are then appropriately combined to construct the encryption key (step 464). The combination of the data $P_{k3}$ and $P_{k4}$ within partial keys 340a and 340b, respectively, could involve the use of any suitable mathematical, logical, or string function, or any combination thereof.

In a third implementation, the security processor 304 is configured to use the authorization data to locate the partial keys using a linked list or an array, e.g., an array containing pointers to partial key locations. In this embodiment, security processor 304 is configured to use the authorization data to locate a first partial key, e.g. partial key 334a containing data $P_{k5}$ and pointer $A_{k5}$ (steps 452 and 454). The security processor could then locate partial key 334b using pointer $A_{k5}$ (steps 456 and 462). The data $P_{k5}$ and $P_{k6}$ within partial keys 334a and 334b, respectively, are then appropriately combined to construct the encryption key (step 464). The combination of the data $P_{k5}$ and $P_{k6}$ within partial keys could involve the use of any suitable mathematical, logical, or string function, or any combination thereof. While for illustrative purposes, the encryption key described herein is formed using only two partial keys, any number of partial keys may be combined, with each partial key pointing to the next, until a partial key includes a null pointer. In this implementation, there is a "serialization" enforced as the security processor 304 locates the partial keys. This serialization makes it difficult for an attacker to construct the encryption key because the attacker would need to know the order of the partial keys in addition to having all the partial key data.

In a fourth implementation, security processor 304 is configured to use the authorization data to locate a first partial key, e.g. partial key 340a (steps 452 and 454). Partial key 340a contains a pointer $A_{k3}$ to partial key 340b. Security processor 304 then locates partial key 340b using this pointer (step 456 and 462). The data within partial keys 340a and 340b, $P_{k3}$ and $P_{k4}$, is then appropriately combined to construct the encryption key (step 464). In this implementation, the encryption key is constructed only using data from partial keys located inside the key sea 318. As described above, these partial keys are not distinguishable from other random or pseudo-random data in the memory 318.

Such partial key encryption methods, when implemented on secure storage devices with tamper-protection barriers offer a myriad of advantages. For instance, first because the partial keys are not necessarily easily distinguished from other data stored in memory, attackers cannot easily identify the partial keys even if they are able to access data stored in memory. Second, because the partial keys are stored in different memory locations and/or memory devices, an attacker would have to access a plurality of memory devices to obtain enough partial key data to be able to construct the encryption key. Third, the partial keys could be stored in different memory locations on each secure storage device such that even if an attacker was able to obtain a large number of samples of the device, it would be exceedingly difficult to leverage information obtained from one device in analyzing another. This is because the attacker does not know a priori in which memory device, or what address within that memory location, a particular partial key is located. This configuration is referred to as "per-instance keying" or having "device-dependent partial key locations".

In some embodiments, the memory device which includes the key sea varies from one secure storage device to another, e.g., it may be in memory 318 in one device and memory 312 in another device. This practice reduces the vulnerability of the encryption key to attackers. In some embodiments, the key sea is periodically updated, e.g., every few seconds to every few hours the pseudo-random data in the key sea is refreshed. This practice results in a key sea with new pseudo-random data thereby reducing the vulnerability of the encryption key to attackers. In other embodiments, there are two or more memory devices with key seas. Again, this makes it harder for attackers to determine the encryption key because the key partial keys are spread across multiple memory devices.

Figure 4B:
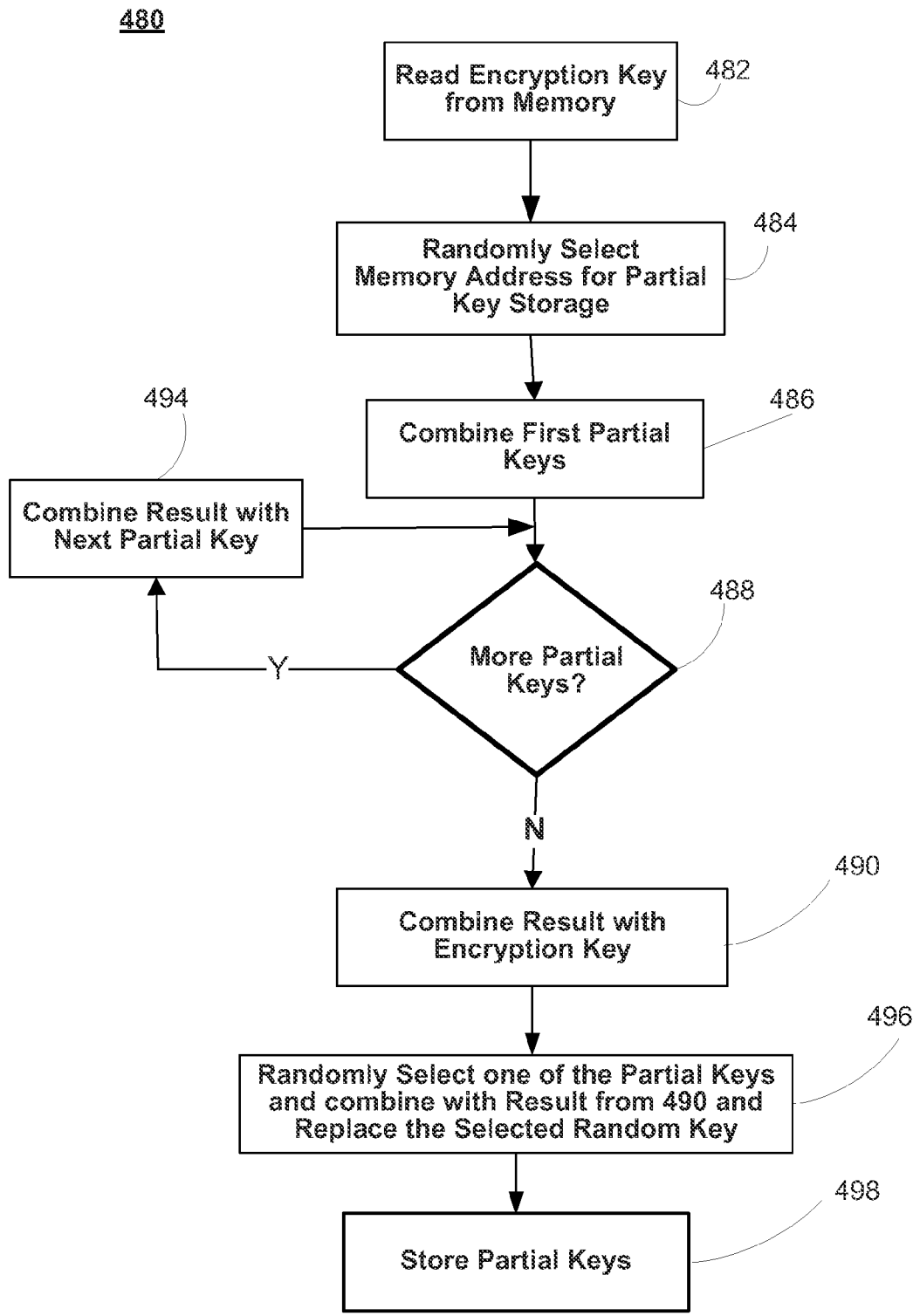
FIG. 4B is a process flow diagram for deconstructing an encryption key into two or more partial keys and destroying the encryption key, according to an illustrative embodiment.

Once the encryption key has been used, it is desirable to deconstruct the encryption key into two or more partial keys, as described in relation to FIG. 4B. In some embodiments, once the encryption key has been used and or is idle for a certain time period, e.g. 15 seconds to one hour, the security computer processor deconstructs and destroys the encryption key.

FIG. 4B is a process flow diagram 480 for deconstructing an encryption key into two or more partial keys, according to an illustrative embodiment. As described above in relation to FIGS. 3 and 4A, if authorization data is available, the authorization data could be used to identify a first memory location, or to identify the location of an array which contains pointers to one or more memory locations, or even to identify partial key memory locations. With reference to FIGS. 3 and 4B, first, the security processor 304 reads the existing encryption key from memory or from one of the processor registers (step 482). The security processor 304 than selects a plurality of memory locations (step 484). Each location contains a number of bits equal to the length of the encryption key, the values of which are selected effectively at random. In one embodiment, the effectively random data is generated by a random number generator that generates large numbers, e.g. significantly larger than 64 bits, however, smaller bit numbers, e.g. 4, 8, 16, 32, etc., may be generated. In another embodiment, each memory location is selected using two random number selections. The first selected number corresponds to a memory device, for example memory devices 310-322. The second selected number corresponds to an offset within that memory, indicating the position of the first bit of the partial key.

Consider the following example, in which security processor 304 selects memory locations 330a and 330b:

The security processor 304 serially combines the data found in the selected memory locations (steps 486, 488, and 494), storing the results at each step it as a temporary result variable. For example, security processor 304 combines data $P_{k1}$ from memory location 330a with data $P_{k2}$ from memory location 330b. The combinations may be performed using any suitable reversible function, preferably XOR. After the data from all selected memory locations are combined (steps 486, 488, and 494), the security processor 304 combines the value stored in the temporary result variable with the encryption key (step 490).

The security processor 304 then randomly selects one of the partial keys and combines this partial key with the result from the step 490. For instance, if the security processor randomly selects $P_{k1}$, then $P_{k1}$ is combined with the result from the previous step, and the result of this combination, referred to as the final key, replaces $P_{k1}$ as a partial key. Finally, the partial keys are stored (step 498). The storage of the partial keys varies based on the particular implementation of the deconstruction process.

For example, in one implementation, the security processor 304 overwrites the data in the memory location used to the create the final key with the final key and stores the memory locations of the partial keys as a "meta-key", for use in locating the partial keys during the key construction process. In another implementation, each partial key is stored in a new memory location along with a pointer to a memory location of a subsequent partial key. In one implementation, one of the two or more partial keys is stored in a memory location that is identified by the authorization data. Then, to reconstruct the encryption key, the security processor 304 can use the authorization data in a key construction process to locate the first partial key as described in relation to FIG. 4A. Corresponding pointers lead the security processor to the remaining partial keys.

In another implementation, the authorization data includes a particular "seed", i.e. input, for a random number generator. The seed is then used in the random number generator used to select the memory locations at step 484 of process 480 in FIG. 4B. The random number generator may be a high quality, e.g., 64, 128, 256, 512, 1024, 2048, 4096, 8192 bit or greater, generator. Then, to reconstruct the encryption key, the security processor 304 can use the authorization data (which includes the seed) and the random number generator to locate the first or all partial key(s) as described in relation to FIG. 4A.

In some implementations, key construction and deconstruction are carried out periodically, e.g. every hour, such that the partial key locations in the memory devices periodically change, making it even more difficult for an attacker to access the partial key data. In some implementations the pseudo-random data in the key sea 318 is refreshed periodically, too.

In other implementations, key construction and deconstruction are carried out at random times i.e. not periodically. In addition, processing activity similar to that carried out during the key construction and deconstruction processes can be initiated on a recurring basis, without changing the keys to mislead observers as to when the processes are actually occurring.

With reference to FIG. 3, it is quite often the case that the security processor 304 within a tamper-protection barrier 302 processes instructions at a much slower rate when under attack. In other instances, when under attack, security processor 304 may be inactive for a long period of time instead of processing a scheduled instruction sequence. Therefore, in some implementations, this slow down or inactivity in processor 304 may be detected by a detection device (not shown in FIG. 3) within tamper-protection barrier 302. Upon detection of a slow down or inactivity, the registers in security processor 304 and/or the memory devices 310, 312, 314, 316, 318, and 320, are erased.

The invention may be embodied in other specific forms without departing from the spirit or essential characteristics thereof. For instance, the devices and methods described herein may be applied to any secure data storage system or device, without limitation. The data to be securely stored may include consumer data such as credit card information, bank account numbers, and social security numbers. The forgoing embodiments are therefore to be considered in all respects illustrative, rather than limiting of the invention.

What is claimed is:

1. A device for constructing an encryption key comprising:
   a first memory to store a first partial encryption key for constructing the encryption key;
   a second memory to store a second partial encryption key, the second partial encryption key including data for constructing the encryption key and location data pointing to a location in the first memory of the first partial encryption key;
   a security processor configured to retrieve the second partial encryption key including the location data, retrieve the first partial encryption key from the first memory using the location data in the second partial encryption key, and combine the first partial encryption key stored in the first memory with the data for constructing the encryption key stored in the second memory, based in part on a function to construct the encryption key; and
   a tamper-protection barrier to enclose the first memory, the second memory and the security processor.

2. The device of claim 1, wherein the function is one of a logical function, a mathematical function, and a string function.

3. The device of claim 2, wherein the function is an exclusive-or (XOR) logical function.

4. The device of claim 1, wherein the device includes a single memory device for storing data for constructing the encryption key.

5. The device of claim 1, wherein the security processor is configured to destroy a constructed encryption key if the processor detects the penetration of the tamper-protection barrier.

6. The device of claim 1, wherein the security processor is configured to use a constructed encryption key to decrypt secure data.

7. The device of claim 6, wherein the secure data is stored in the device.

8. The device of claim 6, wherein the secure data is outside the tamper-protection barrier and decrypted within the tamper-protection barrier.

9. The device of claim 1, wherein the security processor is configured to deconstruct a constructed encryption key after the secure data is decrypted.

10. The device of claim 1, wherein the security processor is configured to destroy a constructed encryption key after the secure data is decrypted.

11. The device of claim 1, wherein the security processor is configured to authorize the performance of a task using a constructed encryption key.

12. The device of claim 1, wherein the security processor is configured to destroy the partial encryption keys if the security processor detects the penetration of the tamper-protection barrier.

13. The device of claim 1, wherein the security processor receives authorization data for initiating the process of combining the first partial encryption key and the data for constructing the encryption key included in the second partial encryption key.

14. The device of claim 13, wherein the security processor locates the first partial encryption key using the received authorization data for initiating the process of combining the first partial encryption key stored in the first memory and the data for constructing the encryption key stored in the memory.

15. The device of claim 1, wherein the security processor is further configured to
   create the partial encryption keys for storage in the first and second memories memory based in part on a function to deconstruct the encryption key;

store the created partial encryption keys in the first and second memories memory; and destroy the encryption key after storing the created partial encryption keys.

16. The device of claim 1, wherein the first memory and the second memory reside in two memory devices.

17. The device of claim 1, wherein the first memory and the second memory reside in a same memory device.

18. A method for constructing an encryption key comprising:

storing a first partial encryption key for constructing the encryption key, a first memory enclosed in a tamper-protection barrier;

storing a second partial encryption key in a second memory enclosed in the tamper-protection barrier, the second partial encryption key including data for constructing the encryption key and location data pointing to a location in the first memory of the first partial encryption key;

retrieving the second partial encryption key including the location data by a security processor;

retrieving, by the security processor, the first partial encryption key from the first memory using the location data in the second partial encryption key; and combining, by the security processor, within the tamper-protection barrier, the first partial encryption key data stored in the first memory with the data for constructing the encryption key stored in the second memory, based in part on a function to construct the encryption key.

19. The method of claim 18, wherein the function is one of a logical function, a mathematical function, and a string function.

20. The method of claim 19, wherein the function is an exclusive-or (XOR) logical function.

21. The method of claim 18, further comprising the security processor using, within the tamper-protection barrier, the constructed encryption key to decrypt secure data that is stored in the device.

22. The method of claim 18, further comprising the security processor destroying, within the tamper-protection barrier, the constructed encryption key after the secure data is decrypted.

23. The method of claim 18, further comprising the security processor deconstructing, within the tamper-protection barrier, the constructed encryption key after the secure data is decrypted.

24. The method of claim 18, wherein the first memory and the second memory reside in two memory devices.

25. The method of claim 18, wherein the first memory and the second memory reside in a same memory device.

* * * * *